March 12, 1957 V. J. TERRY ET AL 2,785,371
REGULATED RECTIFIER POWER SUPPLY EQUIPMENT
Filed April 28, 1953 2 Sheets-Sheet 1
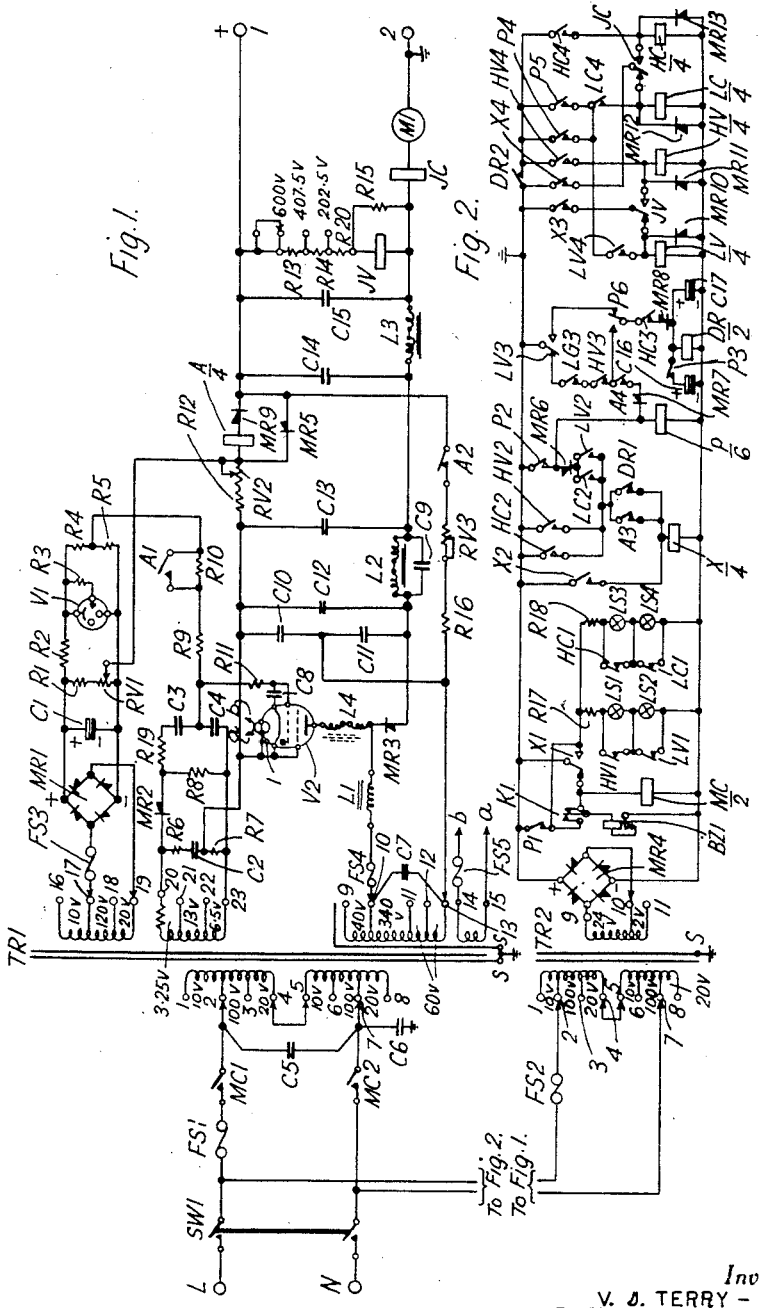
Inventor
V. J. TERRY – R. KELLY –
R. S. MILLER – P. S. KELLY
By Philip M. Bolton
Attorney

United States Patent Office 2,785,371
Patented Mar. 12, 1957

2,785,371

REGULATED RECTIFIER POWER SUPPLY EQUIPMENT

Victor John Terry, Richard Kelly, Ronald Stuart Miller, and Patrick Stanley Kelly, London, England, assignors to International Standard Electric Corporation, New York, N. Y.

Application April 28, 1953, Serial No. 351,716

Claims priority, application Great Britain May 9, 1952

8 Claims. (Cl. 321—11)

This invention relates to regulated rectifier power supply equipment for supplying direct current to a load from an A. C. source, and is of particular utility in the supply of power to telecommunication systems, especially those comprising repeater stations having no power supply of their own, or access to a suitable supply.

According to the invention, there is provided regulated rectifier power supply equipment for the supply of direct current power to a load circuit from an A. C. source in controlled stages, which comprises a thyratron and a rectifier arranged to be permanently connected to a load, means controlling a first stage of supply comprising means for connecting said thyratron and said rectifier to an A. C. source, and biassing means for controlling the said thyratron and arranged also to disable the said thyratron for a predetermined period of time after connection to an A. C. source, whereby said rectifier alone supplies power for said period of time while said thyratron warms up; means controlling a second stage of supply controlled by the eventual output from said thyratron for connecting said thyratron and said rectifier as a voltage-doubling pair for the subsequent and continuing supply of full power under the regulating control of the said thyratron.

The invention will now be particularly described with reference to the accompanying drawing which illustrates a preferred embodiment.

In the drawing:

Fig. 1 shows the power supply equipment proper, for supplying a load circuit in controlled stages;

Fig. 2 shows a controlling circuit for controlling the operations of Fig. 1; and Fig. 3 is a chart showing the sequence of operations under various conditions.

The power supply equipment, or unit, as it may be referred to briefly, is intended to supply from an attended controlling station direct current power to a number of sub-stations connected by land-line to the controlling station. The power supplied is controlled for constant current at the output terminals, and the substations in this embodiment are assumed to be unattended telephonic repeater stations comprising thermionic valves requiring regulated supplies of anode and heater current.

The equipment to be described is ideally suited for submarine cable repeaters to which access is not readily available once the cable with its built-in repeaters has been laid on the sea-bed, and in which extreme care must be exercised in the supply of power over the conductors of the cable to avoid damage to the valves in the repeaters supplied.

Although, theoretically, any number of such substations (or repeaters) may be supplied in tandem from a single controlled source, design considerations will limit the number to a practicable maximum determined by the design of the repeaters, and the need to avoid dangerous supply voltages and excessive input powers at the cable-head.

The equipment in the supply unit consists essentially of a transformer, rectifier, smoothing circuit and control circuit. The rectifier is a voltage doubler consisting of a metal rectifier in one arm of the doubler and a thyratron in the other arm, the thyratron performing a regulating function in addition to rectifying. A measure of pre-heating for the heaters of the valves at the repeater stations is obtained by utilising the half-wave power from the metal rectifier during the pre-heating time of the thyratron, which is the controlling factor. This half-wave power to the line is an unregulated supply, but can be preset to any required current under normal conditions by the adjustment of a potentiometer and is then subject only to mains variation. At the end of the pre-heating time, the thyratron is brought into circuit and the output to the line is then "current controlled" to a value practically independent of supply voltage and loop resistance etc.

GENERAL DESCRIPTION

Referring to Fig. 1 of the accompanying drawing, a voltage doubler rectifier circuit (V2, MR3) feeds the external load of repeaters via a two stage low pass filter circuit and a current controlling resistance (R12, RV2). During one half cycle the thyratron V2 supplies a rectified pulse into its reservoir condenser C10, whilst in the next half cycle the selenium rectifier MR3 supplies its reservoir condenser C11 with a rectified pulse. Normally the selenium half-wave rectifier provides output voltage determined by the actual value of the supply voltage, the transformer ratio and the fixed current; while the firing instants of the thyratron half-wave rectifier are controlled so that it provides the necessary balance of voltage to maintain the fixed current through the resistance of the load.

Under short circuit conditions in the load the voltage across the reservoir condenser of the thyratron half-wave rectifier is actually reversed because the firing point of the valve is so much delayed that the thyratron fires after the A. C. has actually reversed, and it thus acts in opposition to the rectified D. C. obtained from the selenium rectifier, and so prevents undue rise in output current.

The control of the power supplied is conveniently obtained by variation of the thyratron firing instants, but this variation is dependent in the first place upon a variable D. C. bias which is the result of balancing a standard potential against the IR drop in the control resistance due to the partly smoothed rectified current. If the current rises, the balance changes to render the bias more negative. A roughly saw tooth wave form at supply frequency is added to the bias. This renders the grid suddenly negative when the A. C. is applying its negative half cycle to the thyratron anode and during the half cycle of the supply voltage which makes the anodes positive, the negative saw tooth wave falls steadily. If the rectified current is small and the balance of grid bias only slightly negative (or even positive) the valve will fire as soon as the anode potential is sufficiently positive, despite the opposing effect of the saw tooth grid voltage. If however, the rectified current is larger and the grid bias is more negative, the thyratron cannot fire until a little later in the cycle when the negative voltage of the saw tooth wave has somewhat abated.

The standard voltage is the approximately constant maintaining voltage of a gas tube V1, supplied with direct current through a resistance R2 from a separate rectifier MR1 (R3 supplies a priming electrode), but from this standard voltage a small voltage is deducted which, being unregulated, varies in sympathy with the mains and serves to compensate the slight tendency of the ouput current to rise with the supply voltage.

A further compensation is provided by the addition of a small amount of the supply voltage to the grid of the thyratron in opposition to the A. C. applied to its anode. This serves to annul the tendency of the thyratron to fire more readily when a large potential is applied to its anode than when the anode is only a little positive. This voltage is phase advanced to promote stability.

Upon connection of the unit to the A. C. source, the thyratron is disabled by negative pulses from the saw tooth supply, and a delay circuit is provided to delay the application of enabling bias from the D. C. bias circuit so as to give time for the thyratron heater to warm up, before the thermionic emission is used. This same period is utilised for the pre-heating of the valves in the repeaters at a reduced current to the line. This is a very important precaution to adopt, particularly when supplying a submerged repeater system, in order to avoid thermal shock to the repeater valves by the sudden application of the full normal supply voltage. MR3, working as a half-wave rectifier, is used to supply the pre-heating current.

The equipment and its control will now be described in full detail with reference to the drawing, under the heads of:

(a) Switching on—the preheating period;
(b) The thyratron control circuit; and
(c) Detailed control circuit operation (automatic control).

*(a) Switching on—the pre-heating period*

The equipment is shown in Fig. 1 as operating from single phase A. C. supply. Upon connecting the A. C. power to the equipment at terminals L and N and operating main switch SW1, relay MC will operate (as disclosed in section (c)) and extend the supply to the primary winding or windings of the main supply transformer TR1. This is shown as having a primary winding in similar, tapped halves, to accommodate a range of possible input voltages, and in this instance is shown connected for 230 volts. The main secondary winding (10—13) of TR1 feeds power to the metal rectifier MR3, and through the smoothing circuit (C11, L2, C14, L3, and C15), the control limiting resistances R16 and RV3 and the back contact A2 of relay A, half-wave rectified power is supplied to the line at terminals 1 and 2 for the pre-heating of the valve heaters at the repeater stations. The resistance RV3 is adjusted to give the required pre-heating current to the line. The normal A. C. voltage is simultaneously applied to the heater of the rectifying thyratron from secondary winding 14—15.

During this pre-heating time and until relay A has operated, the full working connection of the bias circuit is not established; instead a saw-tooth voltage derived in MR2 and R8 is applied via C3 to keep the thyratron grid negative and prevent the anode/cathode path of the valve from conducting. This negative voltage is however being slowly overcome by a positive voltage, (derived from the stabiliser V1), which is developed across C4 through the time delay resistances R10 and R9. When the total grid voltage is sufficiently positive the thyratron will commence to fire and add to the line current. When the thyratron passes sufficient current relay A will operate. The operation of relay A terminates (by the opening of A-2) the pre-heating condition on the line, establishes the grid/cathode bias voltage of V2 at its normal working value (by short-circuiting R10 at A-1), and thus permits the thyratron V2 and metal rectifier MR3 to operate as a controlled voltage doubler circuit to supply the controlled current value to the line. During the transition, the current to the line is continuous and increases rapidly from its pre-heating value to its final controlled value, in this instance, of 100 mA.

Variable resistor RV2 in association with the tappings on secondary winding 9—13 permits the output voltage to be set to approximately 200 v., 400 v. or 600 v., according to the number of repeaters 1, 2 or 3 to be supplied, the tapping on resistors R13 and R14 being adjusted accordingly.

The external load current, plus a small current drain through the voltage relay (JV) circuit and condensers C14 and C15, passes through resistors R12 and RV2. The voltage developed across these resistors, in conjunction with the reference voltage and small A. C. stabilising voltages, is fed to the grid of V2 and controls the main output current of the unit. The choke coil L1, in the A. C. circuit, limits the rate of increase of current in the thyratron.

Rectifier MR5 in conjunction with rectifier MR9 acts as a by-pass circuit to prevent relay A from operating on the backward surge current through condensers C12 and C13 when the unit is initially switched on.

Choke coil L4 and condensers C5 and C6 are for radio interference suppression. Condenser C7 is for power factor improvement, and condensers C12 and C13 together with choke coil L2 and condenser C9 provide an additional stage of smoothing for the full working conditions.

*(b) Thyratron control circuit*

Rectifier MR1 supplies power for the reference voltage stabilising tube V1 which stabilises between 90 v. and 100 v. within close limits. About 85 v. of this is tapped off at R5 from the resistance chain R4 and R5 and is fed into the thyratron grid circuit.

For a given firing instant the thyratron will pass more current if the supply voltage is high, because the current builds up more rapidly in L1. It is therefore necessary, when the supply voltage rises, to delay firing slightly. This is accomplished as already mentioned by subtracting from the standard voltage a smaller voltage which varies in sympathy with the supply. The voltage increase across the lower portion of RV1 subtracts from the standard voltage since they have a common negative connection.

The total reference voltage is connected in series opposition to the control voltage developed across resistors R12 and RV2 and is very nearly equal to it.

An increase in load current will therefore result in making the grid of V2 more negative with respect to its cathode and conversely for a decrease in load current. Similarly an increase in mains voltage will result in making the gird more negative, and conversely for a decrease in mains voltage.

Resistance R9, in conjunction with condensers C3 and C4 provides smoothing for the grid of V2. Resistance R11 is a grid stopper for preventing parasitic oscillations in the thyratron, and condenser C8 short circuits any very high frequencies picked up on the grid.

To delay the firing point of the thyratron to as late as possible in its half cycle of conduction a roughly saw tooth waveform and A. C. sine waveform are superimposed on the steady D. C. and together injected into the grid/cathode circuit of the thyratron.

The saw tooth waveform has the effect of allowing the thyratron to pass a controlled amount of current regularly each cycle. Without the saw tooth wave, the thyratron is likely to pass a large pulse of current every other half cycle or even every third or fourth half cycle. The saw tooth waveform circuit consists of MR2, R8 and R19, C3 and C4, the voltage developed across C4 being fed to the grid.

The sine waveform is of the same frequency as the alternating anode voltage, but is in antiphase to it and its amplitude is related to this voltage by the inverse of the control ratio. The effect is to prevent the thyratron from firing due to the anode voltage alone. This sine voltage to the grid is obtained from the R6, C2 and R7 chain which is connected across the 22.75 v. winding of TR1. Condenser C2 provides a phase adjustment. The actual voltage used is developed across R7 and is fed to the grid via C4.

(c) Detailed control circuit operation (automatic control)

Figure 3:
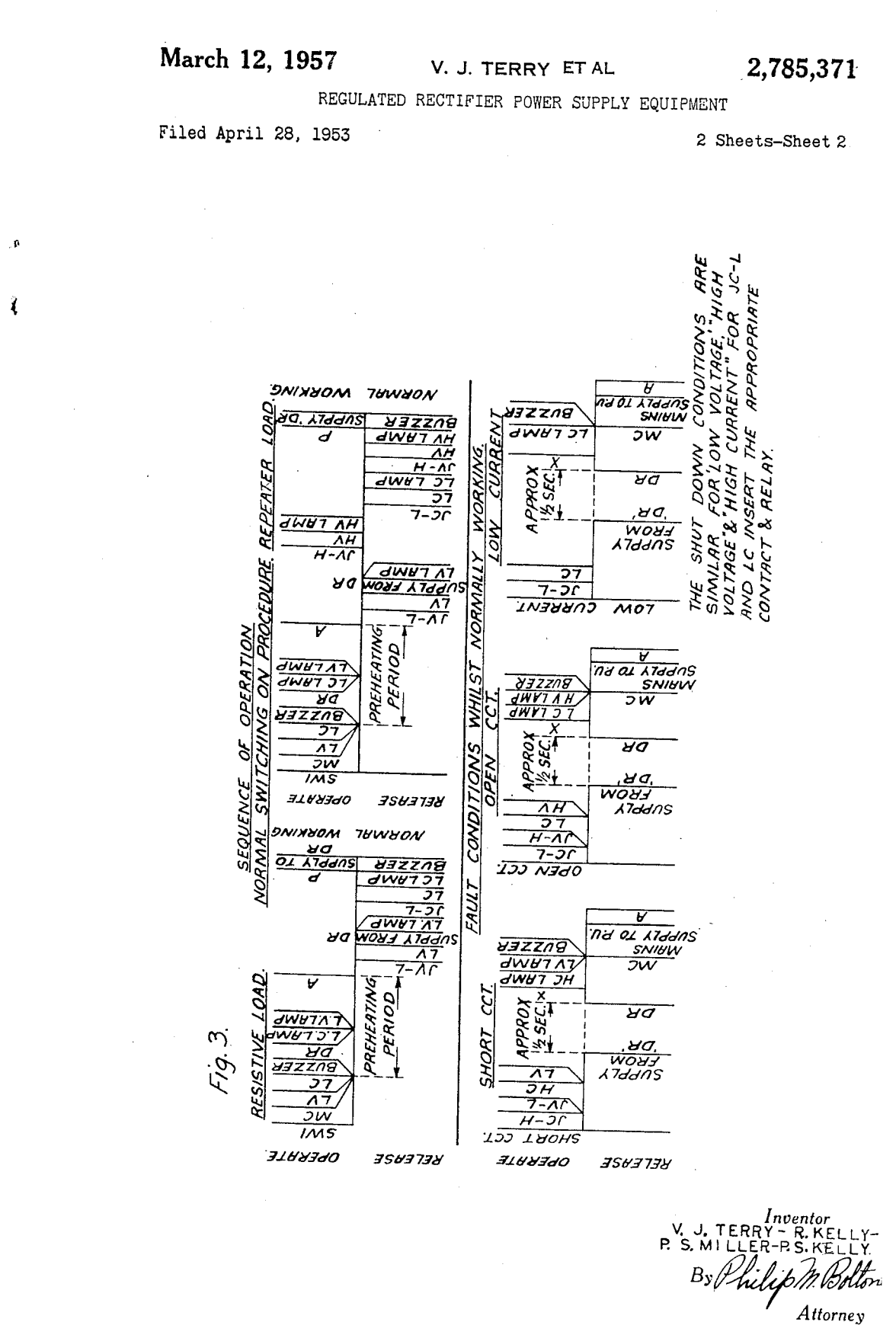

The operating control circuit by which the supply unit is energized from the A. C. mains and connected up to supply the load, and which also provides for certain contingencies which may arise in normal operation, is shown principally in Fig. 2. Fig. 3 is an operation sequence chart which summarises the various relay etc. operations for various conditions, and groups them in order of operation.

The various conditions considered are:

(i) Normal working into a resistive load;
(ii) Normal working into a repeater load;
(iii) Short circuit while normally working;
(iv) Open circuit while normally working;
(v) to (viii) Abnormal conditions of low current, high current, low voltage, high voltage while normally working.

The circuit convention used in Figs. 1 and 2 is that of "detached contacts," by which a relay is indicated by a box given a designation consisting of a code letter (or letters) and a figure (indicating the number of independent contact sets), and the individual contact sets are placed in their most convenient circuit positions and identified by the relay code letter(s) and a serial number.

Relay A and two of its contacts; the two contacts of relay MC; and the coils of JV and JC (which are marginal type relays) will all be found in Fig. 1.

The operation control equipment is energized from the A. C. supply via a step-down transformer TR2 which feeds a rectifier bridge MR4. The unidirectional output from this bridge is used unsmoothed to operate the control circuit.

Since the load current is controlled on a "constant current" basis, any abnormal or excessive variations in the load circuit will tend to be eliminated by the control and give no indication of their existence. The JV relay, a marginal voltage device, is therefore equipped across the load input terminals to give indication of voltage variations thereat, which will constitute the only reliable indication of such abnormal conditions.

(i) Normal working into a resistive load

SW1 is closed, to energise the unit from the mains.
MC/2 operates over the back contact of X-1.
MC-1 and MC-2 connect the A. C. mains to the main transformer TR1 and the unit supplies pre-heating power to the line, as previously described.
The buzzer sounds over P-1 and K1.
LV/4 operates over X-3 and JV-L, since JV will still be lying on its low contact.
Note that the JV series resistors R13 and R14 will be strapped out as required according to the output voltage intended.
LV-1 removes the short-circuit from LS2 and the lamp lights.
LV-2 is in the X-4 relay circuit but is not operative at this stage.
LV-3 changes over and completes the circuit, via the back contact of P-6, for the operation of relay DR-2, the charging of condenser C17, and the charging of condenser C16 via contact P-3.
LV-4 is in the locking circuit for the LV relay but is not operative until P-4 closes.
LC/4 operates over X-4 and JC-L, since JC also will be lying on its low contact.
LC-1 removes the short-circuit from LS4 and the lamp lights.
LC-2 is in the X/4 relay circuit but is not operative at this stage.
LC-3 further breaks a parallel path of the P/6 relay circuit.

LC-4 is in the locking circuit for the LC relay but is not operative until P-5 closes.
Since relay DR/2 has operated, DR-1 breaks a parallel path of the X/4 relay circuit, DR-2 prevents relays LV, HV, LC and HC from locking themselves operated.
After the pre-heating time, relay A/4 operates to thyratron current. A-1 short circuits the time delay resistor R10 and the control is now working normally.
A-2 breaks the pre-heating circuit.
A-3 finally opens the X/4 relay circuit (DR-1 is already open).
A-4 closes and prepares the circuit for the operation of relay P-6.
Quickly following the operation of relay A/4, the armature of relay JV will leave its low contact and move towards its "floating" position, thus releasing relay LV/4.
LV-1 short circuits the low voltage alarm lamp.
LV-2 is in the X/4 relay circuit but is not operative.
LV-3 changes over and firstly breaks the DR/2 relay circuit and secondly prepares the P/6 relay circuit.
LV-4 restores to normal and is not operative.
Relay DR/2 cannot immediately release because it is held operated by the discharge current from condensers C16 and C17. These two condensers combined provide relay DR/2 with a time delay of approximately 6 seconds.
As the load current approaches normal then the armature of the current relay JC will leave its low contact and move towards its 'floating' position, thus releasing relay LC/4.
LC-1 short circuits the low current alarm lamp.
LC-2 restores to normal in the X/4 relay circuit.
LC-3 completes the circuit for the operation of relay P/6.
LC-4 restores to normal and is not operative.
Since relay P/6 has now operated, P-1 opens and stops the buzzer.
P2 closes but is not operative if contact DR-1 is still open, i. e. if 6 seconds has not elapsed since the circuit of relay DR/2 was broken by the operation of contact LV-3 to normal.
P3 opens and disconnects condenser C16 from the DR/2 relay circuit. This is now the normal running condition of relay DR/2 and condenser C17 provides it with a time delay of approximately one-half second only.
P-4 prepares the locking circuit for relay LV/4.
P-5 prepares the locking circuit for relay LC/4.
P-6 changes over and restores the supply to relay DR/2 and condenser C17.
The control circuit is now operating normally.

(ii) Normal working into a repeater load

The real purpose of the longer initial time delay for relay DR is when the unit is supplying a repeater load. During the pre-heat period the heaters of the valves in the repeaters become sufficiently hot for emission to take place. The anode current thus flowing is at the expense of the heater current. The valves thus partially cool down so that when the unit is switched to full power, the heaters have to be further heated and this causes an overswing of voltage. The voltage, however, returns to normal before 'DR' releases (approximately 6 seconds). During normal operation the time delay available from relay 'DR' is automatically reduced to approximately half a second. This shorter time delay is to prevent the unit from shutting down due to momentary operation of the control relays caused by sudden large mains variations.

CONSIDERATION OF A LOW CURRENT FAULT (This is condition (V) mentioned above)

JC-C makes on its 'L' contact.
The circuit is thus complete for the operation of relay LC/4.

LC-1 removes the short-circuit from LS4 but the lamp will not light since the supply to it is broken at P-1.

LC-2 prepares the circuit for the operation of relay X/4 (contacts A-3 and DR-1 are open).

LC-3 breaks the DR/2 relay circuit. The relay will not release immediately, however, since it is held operated by C17.

LC-4 prepares the locking circuit for relay LC/4.

If the low current fault persists for longer than approximately ½ second, then relay DR/2 will release.

DR-1 will close thus enabling relay X/4 to operate over contacts P-2, LC-2 and DR-1.

DR-2 closes and relay LC/4 locks up over contacts DR-2, P-5 and LC-4.

Since relay X/4 has operated,

X-1 changes over breaking MC/2 relay circuit and connects the supply to the buzzer and the alarm lamp circuit thus lighting the low current lamp LS4.

X-2 locks up the X/4 relay circuit.

X-3 opens and prevents the LV/4 relay from operating when the mains supply is removed from the unit and giving a false alarm.

X-4 acts similarly in the LC/4 circuit, but in this case is inoperative since LC-4 has already locked up the relay.

Since relay MC/2 releases,

MC-1 and MC-2 remove the mains supply from the power unit.

*Conditions* (iii), (iv), (vi), (vii), (viii)

The procedure is similar (using the appropriate relays), for low voltage (LV relay), high voltage (HV relay), high current (HC relay), open circuit and short circuit faults. On open circuit the HV and LC relays operate simultaneously and on short circuit the HC and LV relays operate simultaneously.

The chart of Fig. 3 illustrates the various circuit processes chronologically.

For the normal current and voltage variations (conditions (v) and (viii)) it is expected that the thyratron regulating circuit will have operated well within the one-half second's delay allowed for the release of DR, and conditions will have been restored to within the normal operating limits of JV and JC. Mains variations of ±15% can be tolerated at the input, and reduced to variations of less than 1% at the output.

The various rectifiers shown in the control circuit have the following functions:

MR10—MR13 are spark-quenchers for the JV and JC contacts.

MR8 prevents condenser C17 being operative in other relay circuits.

MR6 and MR7 prevent interaction between two relay circuits sharing a common path, thus allowing for a certain amount of circuit simplification.

An important practical detail of a power supply unit of this character is its facility to take the necessary protective action when fault conditions are met. This has been indicated to some extent above, in the section "Consideration of a low current fault," and the protective features as a whole will now be summarised for various conditions of service.

Apart from the fuses (FS1 etc.) the protective features on the unit consist of the current marginal relay JC in series with the load and the voltage marginal relay JV across the output of the unit. The voltage relay is built up by series resistors (as described) to the nominal working voltage of the unit i. e. 600 v., 407.5 v., or 202.5 v. The relay coil is shunted by R15 and the ground end of R15 is connected to the negative line by a separate wire. This is to ensure that if the JV coil should become disconnected from the negative side of the unit a high voltage cannot exist between the coil and its contacts which are in the ground side of the alarm circuit.

When the unit is operating normally and then develops fault conditions of either low current or high current, or low voltage or high voltage, the unit will shut down, the appropriate alarm indicator lamp will glow and a buzzer will sound, provided the fault has continued to exist for approximately 6 seconds. The line becoming open circuit will be detected as a simultaneous high voltage and low current fault; and a short circuited line will appear as a simultaneous high current and low voltage fault.

For mains failures lasting up to about one-half second the unit will restore immediately to its full output, without the necessity of reverting to the pre-heating condition as the valve heaters will still be warm. This permits a minimum of delay for short mains failures.

It is normal when the unit is switched on, and throughout the pre-heating period, for the low voltage and low current alarm lamps to light and the buzzer to sound. If, after relay A has operated, a low current and/or low voltage fault exists, then the unit will not shut down but the appropriate lamp(s) will stay lighted and the buzzer will continue until the fault has been cleared. If, therefore, 30 seconds after switching on, the buzzer continues to sound, then a fault should be suspected.

If, however, after relay A has operated a high current and/or a high voltage fault is present then the unit will shut down in the normal way at the end of the 6 second delay and similarly for a combined high current and low voltage fault or for a combined high voltage and low current fault.

An initial open circuit or short circuit fault will cause the unit to shut down, but whether the unit shuts down immediately, or immediately the thyratron fires, or 6 seconds after the thyratron has fired, will depend upon the particular output voltage setting of the unit and the mains input voltage, as indicated below, since the D. C. output voltage is by no means proportional to the A. C. input voltage:

600 V. OUTPUT

Applicable from —10% to +10% supply voltages.

*Initial open circuit fault.*—The open-circuit voltage does not use outside the limits to which JV is set, so JV-H is not operated, and nothing will happen until the thyratron fires. The unit will then shut down after the normal time delay, and light the high voltage and low current alarm lamps and the buzzer will sound.

*Initial short circuit fault.*—The unit will shut down immediately it is switched on. A buzzer alarm only will be given.

This is because LV and DR operate immediately and HC some little time later, when JC-H makes. HC is unable to lock since DR-2 is open, but causes X to operate via HC-2. Operation of X interrupts MC and leads to the shut-down, when JC-H will be released, and HC will fall off. LV also fails to hold, on account of X-3 and DR-2. No lamps, therefore, glow.

407.5 V. OUTPUT

Applicable from —10% to +10% supply voltages.

*Initial open circuit fault.*—The unit will shut down immediately it is switched on. A buzzer alarm only will be given.

This is because the open-circuit voltage is now sufficient to close JV-H, causing HV to operate. The initial operation of LV caused DR to operate, so breaking the LV etc. holding circuits.

Operation of X and release of MC follow and the power is cut off, leaving none of the LV etc. relays operated.

*Initial short circuit fault.*—Conditions are similar to the previous case (600 v.).

202.5 V. OUTPUT

*Initial open circuit fault.*—(Applicable from —10% to +10% supply voltages.)—The unit will shut down immediately it is switched on. A buzzer alarm only will be given. Conditions are similar to the previous case (407.5 v.).

*Initial short circuit fault.*—(Applicable from −10% to nominal supply voltages.)—Nothing will happen until the thyratron fires, then the unit will shut down immediately. A buzzer alarm only will be given. With +10% supply voltage the unit will shut down immediately it is switched on. A buzzer alarm only will be given.

The distinction in this case arises from the magnitude of the short circuit current, and whether or not it is able to make JC–H.

While the principles of the invention have been described above in connection with specific embodiments and particular modifications thereof, it is to be clearly understood that this description is made only by way of example and not as a limitation on the scope of the invention.

What we claim is:

1. Regulated rectifier power supply equipment for the supply of direct current power to a load circuit from an A. C. source in controlled stages, which comprises a voltage doubler circuit including a thyratron and a rectifier permanently connected to a load, additional means connecting said rectifier directly to said load, means controlling a first stage of supply comprising means for connecting said thyratron and said rectifier to an A. C. source, and biassing means for controlling the said thyratron including means for blocking its firing for a predetermined period of time after connection to an A. C. source, whereby said rectifier alone supplies power for said period of time while said thyratron warms up; means controlling a second stage of supply and responsive to the firing of said thyratron for disabling said means connecting said rectifier directly to said load whereby said thyratron and said rectifier act as a voltage-doubling pair for the subsequent and continuing supply of full power under the regulating control of the said thyratron.

2. Equipment as claimed in claim 1 and in which the said biassing means comprises: means for deriving a first bias from an applied A. C. source for application to said thyratron to disable it; means for deriving a second bias from an applied A. C. source; a delay circuit; and means for applying said second bias via said delay circuit to said thyratron to counteract said first bias, and after both biases have been applied for said predetermined period of time, to cause said thyratron to become enabled.

3. Equipment as claimed in claim 1 and in which said biassing means comprises means for generating a saw-tooth voltage bias and means for generating a phase-advanced alternating voltage bias, both from an applied A. C. source, for application to the said thyratron, for regulating its rate of firing, and means for deriving from an applied A. C. source a rectified voltage for application to said thyratron to regulate it in accordance with variations in such an applied A. C. source.

4. Equipment as claimed in claim 1, and in which the said biassing means comprises also a reference voltage source and means for deriving a bias from the full load current supplied by said equipment, and means for applying in opposition said reference voltage and said load current bias to said thyratron to regulate it in accordance with variations in said load current.

5. Equipment as claimed in claim 4 and in which said reference voltage is derived as the steady potential drop across a gas discharge device energised from an applied A. C. source.

6. Equipment as claimed in claim 1, further including relay means operated by the flow of current through said thyratron on being enabled means controlled by operation of said relay for modifying the characteristics of the said delay circuit so as to shorten materially its delay period, and means actuated by operation of said relay for terminating the said pre-heating period by interrupting the direct circuit from the said rectifier, and establishing the said voltage-doubling arrangement.

7. Eqiupment as claimed in claim 1, and which further comprises load-current-sensitive and load-voltage-sensitive marginal relays for detecting excessive variations in load circuit current and voltage respectively, and a controlling circuit dependent on the operation of the said relays for controlling the connection of the said equipment to the said load circuit.

8. Regulated rectifier power supply equipment for the supply of direct current power to a load circuit from an A. C. source in controlled stages, which comprises a thyratron and a rectifier arranged to be permanently connected to a load, and an operational controlling circuit; means in said controlling circuit controlling a first stage of supply comprising switching and relay means for connecting said thyratron and said rectifier in parallel to an A. C. source whereby said rectifier alone supplies power; biassing means for said thyratron including means for generating a saw-tooth voltage bias, means for generating a phase-advanced sine-wave bias, both from an applied A. C. source, and means for applying said biases to said thyratron, whereby said saw-tooth bias is effective to disable said thyratron at least for a specified pre-heating period while the cathode of said thyratron is warming up to a satisfactory operating temperature; further biassing means for deriving from an applied A. C. source a rectified A. C. bias and a standard D. C. voltage, in which said standard voltage means comprises a gas discharge device and a series resistor; a resistance-capacity delay circuit, operative during said thyratron pre-heating period, for applying said D. C. biases to said thyratron control circuit in gradually increasing strength and in a direction to oppose said saw-tooth disabling bias whereby at the end of said pre-heating period said thyratron becomes enabled for supplying its full quota of power under the control of its several biases; relay means operative under control of full output from said thyratron for switching the connections of said thyratron and said rectifier to a voltage-doubling arrangement for the continuing supply of power in a second stage of supply wherein the supply of power is regulated by said thyratron under the control of all said biases and of a further bias derived from the flow of total output current through a biassing resistor and applied in opposition to said standard voltage bias; and in which the said operational controlling circuit comprises an output voltage marginal relay, an output current marginal relay and a slow-to-release relay, whereby the incidence of persistent abnormal fault conditions may be effective via said relays to disconnect said supply equipment from an A. C. supply source, and to give rise to an alarm signal.

References Cited in the file of this patent

UNITED STATES PATENTS 2,440,275   Kelly _____ Apr. 27, 1948